United States Patent
Roth

(10) Patent No.: US 6,837,009 B1
(45) Date of Patent: Jan. 4, 2005

(54) BRACE FOR RESTRICTING RELATIVE MOVEMENT BETWEEN A ROD AND BUILDING STRUCTURE

(76) Inventor: Steven A. Roth, P.O. Box 0933, Alamo, CA (US) 94507

( * ) Notice: Subject to any disclaimer, the term of this patent is extended or adjusted under 35 U.S.C. 154(b) by 0 days.

(21) Appl. No.: 10/436,197

(22) Filed: May 12, 2003

(51) Int. Cl.[7] .................................................. E04B 1/98
(52) U.S. Cl. ................ 52/167.1; 403/408.1; 248/224.8; 24/563
(58) Field of Search .............................. 52/167.1, 713, 52/167.3; 403/408; 248/224.8, 300; 24/570, 563

(56) References Cited

U.S. PATENT DOCUMENTS

| | | | |
|---|---|---|---|
| 5,188,317 A | | 2/1993 | Roth |
| 5,195,710 A | * | 3/1993 | Remblier ...................... 248/300 |
| 5,412,843 A | * | 5/1995 | Krongauz et al. ............. 16/387 |
| 6,026,545 A | * | 2/2000 | Duggan ................... 24/265 AL |
| 6,247,274 B1 | | 6/2001 | Thompson et al. |
| 6,415,560 B1 | | 7/2002 | Rinderer |
| 6,421,965 B2 | | 7/2002 | Thompson et al. |
| 2004/0020140 A1 | * | 2/2004 | Alimon et al. .............. 52/167.1 |

* cited by examiner

Primary Examiner—Milton Nelson, Jr.
(74) Attorney, Agent, or Firm—Thomas R. Lampe

(57) ABSTRACT

A brace for retaining a rod at a fixed location relative to building structure. The brace includes two brace members in face-to-face engagement to define a rod receiving opening with slots formed in the brace members. The brace members are connected together by an integral rigid attachment element at a location spaced from the rod receiving opening and resisting relative movement between the brace members.

19 Claims, 4 Drawing Sheets

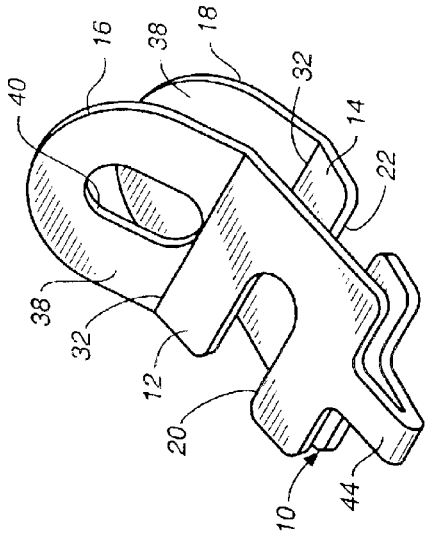
FIG._1A
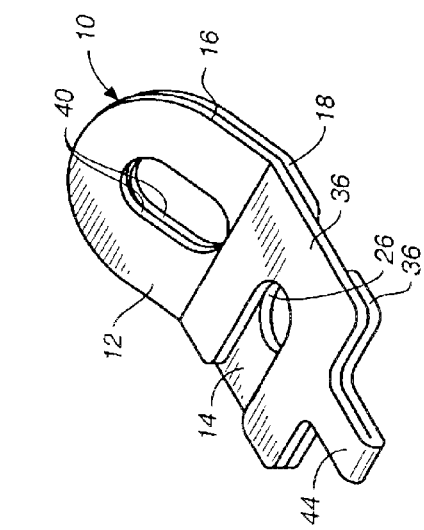
FIG._1B
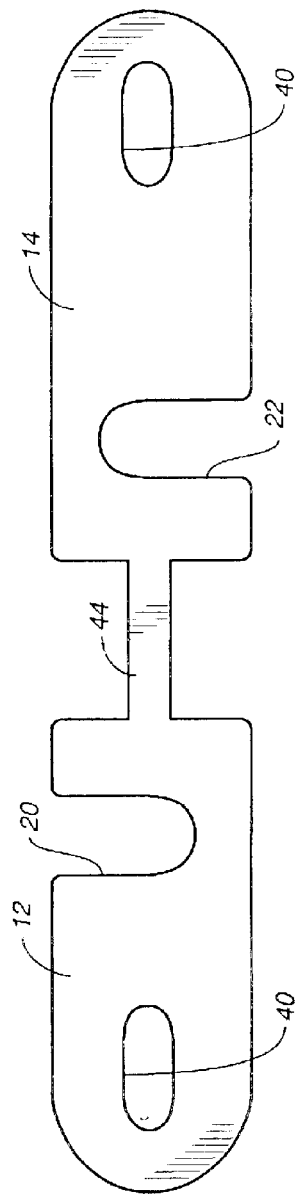
FIG._3

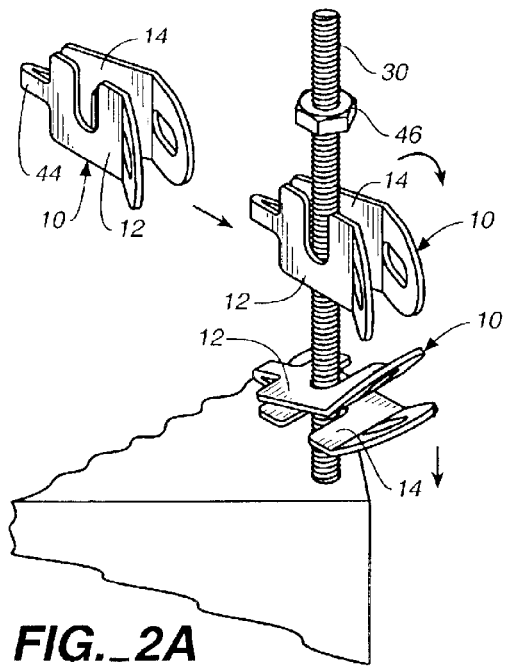
FIG._2A
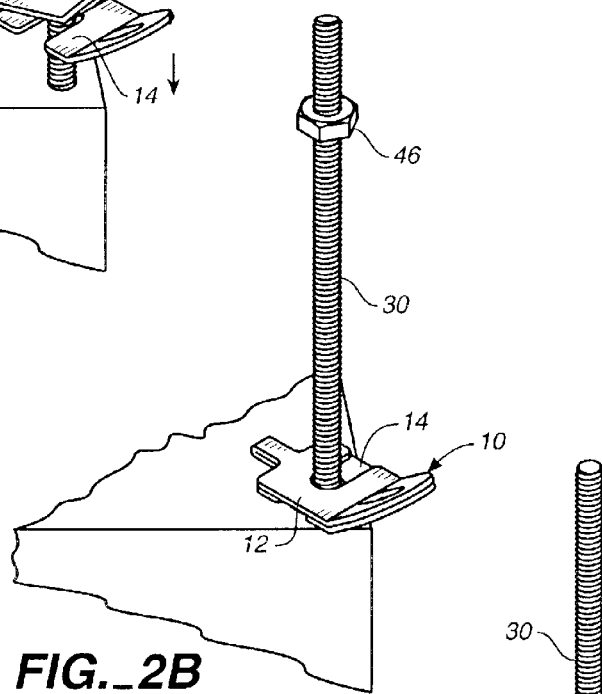
FIG._2B
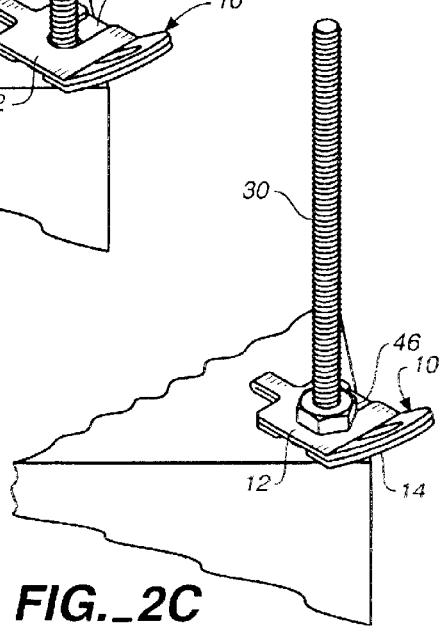
FIG._2C

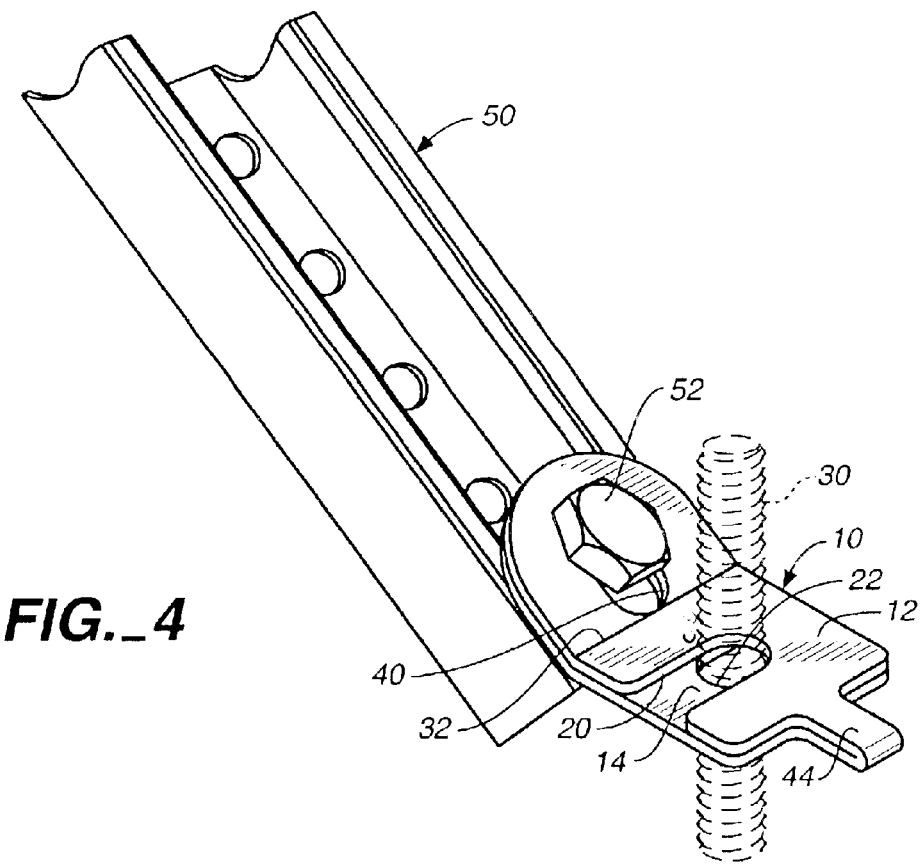
FIG._4
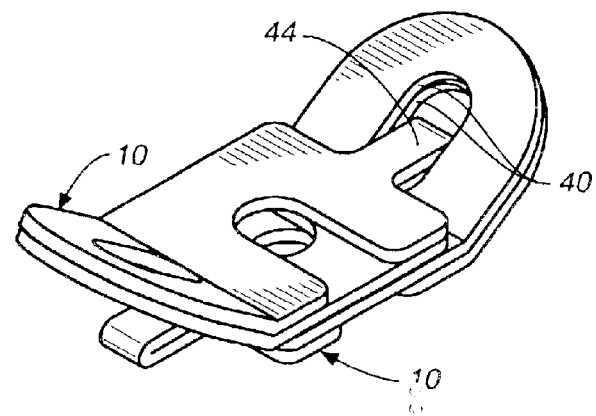
FIG._5

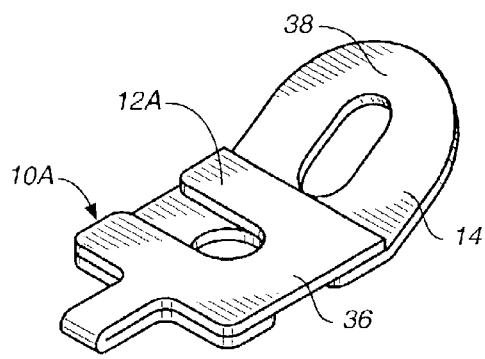
FIG._6A
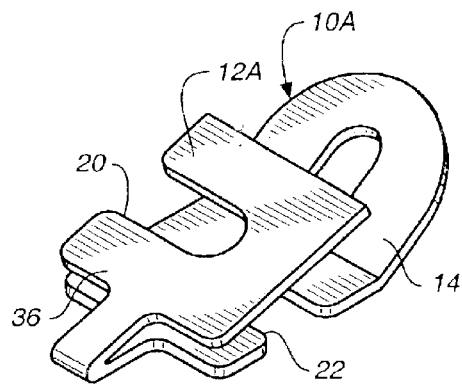
FIG._6B
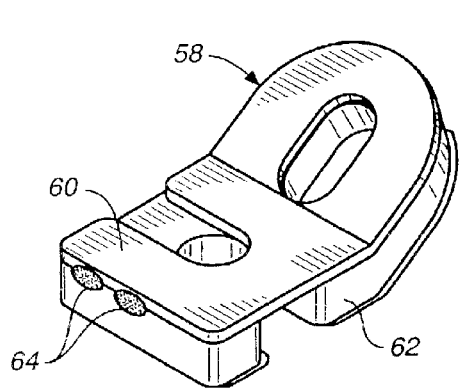
FIG. 7A
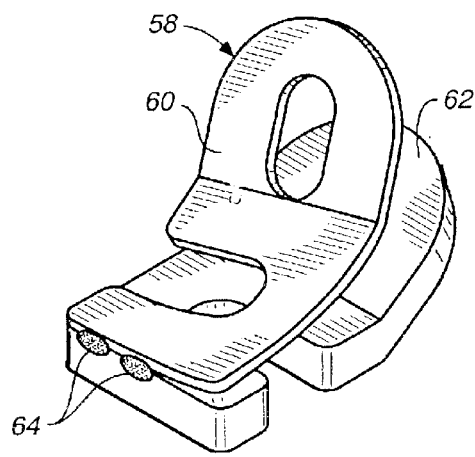
FIG._7B

BRACE FOR RESTRICTING RELATIVE MOVEMENT BETWEEN A ROD AND BUILDING STRUCTURE

TECHNICAL FIELD

This invention relates to a brace utilized to restrict relative movement between a rod, such as a hanger rod, and building structure. The invention is suitable for example to brace a hanger rod during a seismic disturbance.

BACKGROUND OF THE INVENTION

My U.S. Pat. No. 5,188,317, issued Feb. 23, 1993, relates to a lateral brace for a hanger suspended from a rod to support pipes, electrical cables or the like, the lateral brace having two completely separable, slotted interlocking pieces which interlock to form a hole surrounding the rod and attach it to building structure without removing the hanger from the rod.

U.S. Pat. No. 6,247,274, issued Jun. 19, 2001, discloses a seismic brace having a brace arm for fastening to a support rod on one end and a structural portion of a building on the other end. The brace is attachable to the support rod without disconnecting it by a base bracket hinged to the brace arm and a locking bracket hinged to the base arm or the base bracket to overlay the base bracket.

U.S. Pat. No. 6,421,965, dated Jul. 23, 2002, also relates to a seismic brace for fastening to a support rod at one end and a structural portion of a building at the other end. The brace is attachable to the support rod without disconnecting it. The brace arm portion of the seismic brace is bent at an angle of 45 degrees to form a base bracket that connects to the support rod. A locking bracket is hinged to the brace arm to overlay the brace bracket. Both the base bracket and locking bracket have a slot extending from an edge toward the middle, the slots being arranged so that they form an aperture when the locking bracket is moved about the hinge and overlays the base bracket part of the brace arm to completely enclose the support rod.

U.S. Pat. No. 6,415,560, issued Jul. 9, 2002, discloses a connector for connecting a seismic brace to a support rod, such as for a cable tray, to inhibit movement of the rod during seismic activity. The connector comprises a metal connecting member having an upper portion and a lower portion joined at a juncture. Openings in the juncture, upper portion and lower portion define a slot for entry of the support rod into the slot. The connector further comprises a retainer inserted in a gap between the upper and lower portions. The retainer bridges the slot to retain the support rod in the slot.

DISCLOSURE OF INVENTION

The present invention relates to a bracket which is utilized to retain a rod, such as a hanger rod, at a location spaced from building structure and for restricting relative movement between the rod and the building structure. The brace is suitably employed, for example, to brace the rod relative to the structure in the event of a seismic disturbance.

The brace of the present invention differs from the above-referenced prior art arrangements in a number of respects. The brace disclosed herein is characterized by its relatively low cost and efficiency of operation as compared to prior art approaches. The brace is easy to install and once installed is much stronger than devices of equivalent size incorporating hinges, such as those illustrated in the above-referenced U.S. Pat. No. 6,247,274, and 6,421,965. That is, the brace of the present invention can be made of much less bulky material and be of a size considerably smaller than the devices of the prior art noted in the preceding sentence to perform the equivalent bracing function.

For example, the use of thin metal sheet material can be employed to advantage with respect to the invention disclosed and claimed herein. The relative simplicity of the structure of the brace of this invention allows it to be fabricated in very simple fashion. Fabrication of the brace is accomplished readily and simply, as compared to brackets or braces utilizing hinged elements.

The brace of the present invention may be stacked with a brace of like construction to provide additional rod retention strength.

The brace of the present invention is attachable by a connector to a building structure for retaining a rod at a location spaced from the building structure and for restricting relative movement between the rod and the building structure.

The brace is of unitary construction and includes a double-sided first brace member having a first outer peripheral surface disposed between the sides thereof and defining a first closed ended, inwardly extending slot.

The brace also includes a double-sided second brace member having a second outer peripheral surface disposed between the sides thereof and defining a second closed ended, inwardly extending slot.

The first brace member and the second brace member are in overlapping condition and the first and second slots are offset from one another and in communication to form a rod receiving opening. The first brace member and the second brace member are cooperable to surround the rod receiving opening. At least one of the first and second brace members defines a connector receiving opening spaced from the rod receiving opening.

A substantially rigid attachment element is affixed to both the first brace member and the second brace member at a location spaced from the rod receiving opening resisting relative movement between the first and second brace members and maintaining the first and second brace members in the overlapping condition.

Other features, advantages and objects of the present invention will become apparent with reference to the following description and accompanying drawings.

BRIEF DESCRIPTION OF DRAWINGS

FIGS. 1A and 1B are perspective views of a preferred form of brace constructed in accordance with the teachings of the present invention, FIG. 1A showing the brace in the normal position assumed thereby when in use and FIG. 1B showing the two brace members of the brace spaced from one another;

FIG. 2A shows the brace in the condition shown in FIG. 1B being applied to a threaded rod, three sequential positions of the brace being illustrated and arrows being employed to depict sequential movement of the brace through three positions during installation;

FIG. 2B is a perspective view showing the brace fully installed and surrounding the threaded rod;

FIG. 2C is a view similar to FIG. 2B, but illustrating a nut having been threaded downwardly on the rod and into engagement with the brace;

FIG. 3 is a top plan view of a blank which is utilized in the construction of the brace;

FIG. 4 is a perspective view illustrating the brace connected to a building structure by a connector;

FIG. 5 is a perspective view illustrating two of the braces in stacked condition;

FIGS. 6A and 6B are similar to FIGS. 1A, 1B, but illustrating a second embodiment of the invention; and FIGS. 7A and 7D are perspective views illustrating a third brace embodiment, respectively showing the brace in its normal installed condition and the configuration of the brace during installation on a rod.

MODES FOR CARRYING OUT THE INVENTION

Referring now to FIGS. 1A–5, a preferred embodiment of a brace constructed in accordance with the teachings of the present invention is identified by reference numeral 10. Brace 10 is of integral construction and preferably formed of steel sheet material.

Brace 10 includes two double-sided brace members 12 and 14. Brace member 12 has an outer peripheral surface 16 and brace member 14 has an outer peripheral surface 18, the outer peripheral surfaces 16 and 18 being of substantially identical configuration.

Brace member 12 defines a closed ended, inwardly extending slot 20. Likewise, brace member 14 defines a closed ended, inwardly extending slot 22.

When brace 10 is in the configuration shown in FIGS. 1A, 2B, 2C, 4 and 5, the condition when the brace is in actual use, the brace member 12 overlaps and is in face-to-face engagement with brace member 14. The slots 20, 22 are offset from one another and are in communication to form a rod receiving opening 26. The brace members 12, 14 are cooperable to surround a rod with which the brace is utilized, such as threaded rod 30 shown in FIGS. 2A–2C and 4.

Each of the brace members 12, 14 incorporates a bend 32 which divides or defines the brace members into a base portion 36 and a connector portion 38 angularly disposed relative to the base portion. The slots 20, 22 are formed in the base portions 36 of the brace members 12, 14.

The brace member connector portions 38 define connector receiving openings 40 which are somewhat elongated in the embodiment illustrated and are in alignment and in communication with one another when the brace is in the condition shown in FIG. 1A.

A substantially rigid attachment element is affixed to both brace members at a location spaced from the rod receiving opening 26.

The attachment element is in the form of a double-sided strip 44 integral with the brace members 12, 14. The strip extends between the outer peripheral surfaces of the brace members and is bent so that it doubles over upon itself. In the arrangements illustrated, the strip has a width narrower than the widths of both the brace member 12 and the brace member 14.

The doubled over strip projects outwardly from the outer peripheral surfaces of the brace members 12, 14. An important feature or aspect of the present invention is the fact that the strip, once bent over, is a work hardened, rigid member formed under applied force. Once pressure formed to a desired shape, the projecting doubled over strip maintains its shape, serving to maintain the brace members 12, 14 in face-to-face relationship (as shown in FIG. 1A for example) and not functioning as a hinge.

FIG. 3 illustrates a one-piece blank from which the brace 10 is formed. The blank suitably may be stamped out from a sheet of steel or other suitable sheet material.

The strip 44 is initially partially doubled over as shown in FIG. 1B so that a space exists between brace members 12, 14. FIG. 2A illustrates steps carried out when applying the brace in its configuration of FIG. 1B to a threaded rod 30. Quite simply, the brace first is oriented to receive the rod and the brace is positioned with the rod aligned with slots 20, 22. Next, the brace is turned ninety degrees and positioned at the desired location on the rod 30. This can readily be accomplished without disconnecting the rod from any structure to which is has been previously attached.

The user of the brace then presses the brace members 12, 14 into face-to-face engagement. The elements of the doubled over strip 44 are also pressed into engagement to maintain the brace members 12, 14 in face-to-face engagement even after outside pressure has been removed. FIG. 2C shows a nut 46 threaded downwardly on the rod 30 into engagement with the brace, but this is not actually necessary to maintain the brace members in face-to-face relationship since the doubled over strip performs that function.

FIG. 4 illustrates the brace 10 attached to a building structural member 50. This is accomplished by a threaded connector such as bolt 52 extending through the structural element and cooperable with a nut (not shown) to secure the brace 10 in position. This is typically done after the rod has been captured by the brace. In FIG. 4 a portion of a rod 30 is shown in phantom.

It is to be noted that the brace members 12, 14 cooperate to create a very strong and secure installation even though the sheet metal material utilized to construct the brace is not necessarily very thick. Where the brace 10 is connected by connector 52 the brace is of double layer construction all the way between the connector and the rod. The only location where there is not a two-ply or double layer structure is in the locations of slots 20, 22.

FIG. 5 shows how two braces 10 can be stacked to provide additional strength. The attachment element (doubled over strip 44) of one of the braces is positioned in the connector receiving openings 40 of the other brace 10 to restrict relative movement between the braces. Any rod inserted in the stacked braces would be surrounded by at least two layers of brace material, mostly by four layers. The bent, doubled over strip 44 of each brace is, as previously indicated, permanently deformed when the brace is placed into position and four layers of brace material disposed face-to-face are in the stack.

FIGS. 6A and 6B illustrate an alternative form of brace 10A which differs from that shown in FIGS. 1A–5 only by virtue of the fact that the brace member 12A is not as long as brace member 14, the brace member 12A not including a connector portion 38.

FIGS. 7A and 7B illustrate another embodiment of the brace, brace 58. In this embodiment, a brace member 60 is welded to a second brace member 62, the latter being shown as thicker than the former.

The brace members 60, 62 are fixedly secured together by weld material 64 located at one end of the brace 10B at a location where the outer peripheral surfaces of the brace members coincide or register. Bonding materials other than weld material may be utilized to bond the ends of the brace members 60, 62 together.

What is claimed is:

1. A brace attachable by a connector to a building structure for retaining a rod at a location spaced from said building structure and for restricting relative movement between said rod and said building structure, said brace being of unitary construction and comprising, in combination:

a double-sided first brace member having a first outer peripheral surface disposed between the sides thereof and defining a first closed ended, inwardly extending slot;

a double-sided second brace member having a second outer peripheral surface disposed between the sides thereof and defining a second closed ended, inwardly extending slot, said first brace member and said second brace member being in overlapping condition and said first and second slots being offset from one another and in communication to form a rod receiving opening, said first brace member and said second brace member cooperable to surround said rod receiving opening, and at least one of said first and second brace members defining a connector receiving opening spaced from said rod receiving opening; and a substantially rigid attachment element affixed to both said first brace member and said second brace member at a location spaced from said rod receiving opening resisting relative movement between said first and second brace members and maintaining said first and second brace members in said overlapping condition.

2. The brace according to claim 1 wherein said first brace member, said second brace member and said attachment element are of integral construction.

3. The brace according to claim 2 wherein said first brace member and said second brace member are in face-to-face engagement.

4. The brace according to claim 2 wherein said first brace member, said second brace member and said attachment element are integrally formed from a sheet of metal.

5. The brace according to claim 4 wherein said attachment element comprises a double-sided strip of metal sheet material extending between the outer peripheral surfaces of said first brace member and said second brace member bent and doubled over upon itself.

6. The brace according to claim 5 wherein said strip has a width narrower than the widths of both said first brace member and said second brace member.

7. The brace according to claim 5 wherein said strip is work hardened steel, pressure formed during bending thereof.

8. The brace according to claim 1 wherein said attachment element comprises bonding material fixedly bonding said first brace member and said second brace member together at said location.

9. The brace according to claim 8 wherein said location is at or adjacent to the first and second outer peripheral surfaces.

10. The brace according to claim 8 wherein said bonding material comprises weld material welding said first brace member and said second first brace member at or adjacent to the first and second outer peripheral surfaces.

11. The brace according to claim 1 wherein one of said brace members is thicker than the other of said brace members.

12. The brace according to claim 1 wherein at least one of said first and second brace members is flexible and deflect able away from the other of said brace members upon application of manual forces thereto.

13. The brace according to claim 1 wherein at least one of said first and second brace members incorporates a bend defining a brace member base portion and a brace member connector portion angularly disposed relative to said brace member base portion, said connector receiving opening being defined by said brace member connector portion.

14. The brace according to claim 13 wherein each of said brace members incorporates a bend defining a brace member base portion and a brace member connector portion angularly disposed relative thereto, a connector receiving opening being defined by each brace member connector portion.

15. The brace according to claim 1 wherein said first and second brace members have substantially the same outer peripheral surface configuration.

16. The brace according to claim 1 wherein said first and second brace members have different outer peripheral surface configurations.

17. The brace according to claim 1 wherein each of said first and second brace members defines a connector receiving opening.

18. The brace according to claim 17 wherein the connector receiving opening defined by said first brace member is in at least partial registry with the connector receiving opening defined by said second brace member.

19. First and second braces attachable by a connector to a building structure for retaining a rod at a location spaced from said building structure and for restricting relative movement between said rod and said building structure, each of said braces being of unitary construction and each comprising, in combination:

a double-sided first brace member having a first outer peripheral surface disposed between the sides thereof and defining a first closed ended, inwardly extending slot;

a double-sided second brace member having a second outer peripheral surface disposed between the sides thereof and defining a second closed ended, inwardly extending slot, said first brace member and said second brace member being in overlapping condition and said first and second slots being offset from one another and in communication to form a rod receiving opening, said first brace member and said second brace member cooperable to surround said rod receiving opening, and at least one of said first and second brace members defining a connector receiving opening spaced from said rod receiving opening; and a substantially rigid attachment element affixed to both said first brace member and said second brace member at a location spaced from said rod receiving opening resisting relative movement between said first and second brace members and maintaining said first and second brace members in said overlapping condition, said first and second braces being stacked, with the attachment element of at least one of the first and second braces positioned in the connector receiving opening of the other of said first and second braces to restrict relative movement between the first and second braces.

* * * * *